United States Patent
Bruno et al.

(10) Patent No.: US 9,140,152 B2
(45) Date of Patent: Sep. 22, 2015

(54) METHOD TO DIAGNOSE A FAILURE OF AN OPCJ VALVE OF AN INTERNAL COMBUSTION ENGINE

(75) Inventors: Morena Bruno, Chivasso (IT); Davide Donna, Novara (IT); Roberto Argolini, Milan (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1233 days.

(21) Appl. No.: 13/043,144

(22) Filed: Mar. 8, 2011

(65) Prior Publication Data

US 2011/0224883 A1    Sep. 15, 2011

(30) Foreign Application Priority Data

Mar. 9, 2010   (GB) ................. 1003852.9

(51) Int. Cl.
  *G01M 15/00*   (2006.01)
  *F01M 1/08*    (2006.01)
  *F01P 3/06*    (2006.01)

(52) U.S. Cl.
  CPC .. *F01M 1/08* (2013.01); *F01P 3/06* (2013.01); *F16N 2250/04* (2013.01); *F16N 2260/02* (2013.01)

(58) Field of Classification Search
  CPC ............. F01P 2025/04; F01P 2025/06; F01P 2025/08; F01P 2025/40; F01M 1/08; F01M 1/083; F01M 2250/00

USPC .............. 123/41.33–41.45, 196 S; 701/102; 73/114.33, 114.34, 114.55–114.57

See application file for complete search history.

(56) References Cited

U.S. PATENT DOCUMENTS

| | | | |
|---|---|---|---|
| 2005/0120982 A1* | 6/2005 | Ducu | 123/41.08 |
| 2009/0143963 A1* | 6/2009 | Hendriksma | 701/114 |
| 2011/0283968 A1* | 11/2011 | Anderson et al. | 123/196 R |
| 2012/0062894 A1* | 3/2012 | Micali et al. | 356/436 |

FOREIGN PATENT DOCUMENTS

| | | | |
|---|---|---|---|
| JP | 60252116 A | 12/1985 | |
| JP | 200289310 | * 3/2002 | F02D 41/38 |
| JP | 2008038705 A | 2/2008 | |

OTHER PUBLICATIONS

JP 200289310 English translation of text.*
British Patent Office, British Search Report for British Application No. 1003852.9, Jun. 21, 2010.

* cited by examiner

*Primary Examiner* — Thomas Moulis
*Assistant Examiner* — Joseph Dallo
(74) *Attorney, Agent, or Firm* — Ingrassia Fisher & Lorenz PC

(57) ABSTRACT

A method is provided to diagnose a failure of an OPCJ valve of an internal combustion engine. The OPCJ valve is located in an auxiliary line connecting an engine lubrication line to at least an oil jet for squirting lubricating oil from the engine lubrication line towards a piston surface. The method provides for monitoring the pressure variation in the engine lubrication line due to a switching signal sent to the OPCJ valve.

19 Claims, 3 Drawing Sheets

METHOD TO DIAGNOSE A FAILURE OF AN OPCJ VALVE OF AN INTERNAL COMBUSTION ENGINE

CROSS-REFERENCE TO RELATED APPLICATION

This application claims priority to British Patent Application No. 1003852.9, filed Mar. 9, 2010, which is incorporated herein by reference in its entirety.

TECHNICAL FIELD

The technical field relates to a method to diagnose a failure of an OPCJ valve of an internal combustion engine, typically an internal combustion engine of a motor vehicle.

BACKGROUND

It is known that an internal combustion engine of a motor vehicle is provided with a lubrication system suitable for lubricating the rotating or sliding components of the engine. The lubrication system generally comprises an oil pump driven by the engine, which draws lubricating oil from a sump and delivers it under pressure through a main oil gallery in the engine cylinder block, wherein said main oil gallery is connected via respective pipes to a plurality of exit holes for lubricating crankshaft bearings (main bearings and big-end bearings), camshaft bearings operating the valves, tappets, and the like.

In order to cool the engine pistons, most internal combustion engines are provided with an auxiliary oil gallery in the engine cylinder block, which is connected via respective pipes to a plurality of oil jets for squirting lubricating oil into an upper crankcase area towards piston surfaces. The auxiliary oil gallery is connected to the main oil gallery via a feeding line equipped with a valve for selectively open or close said feeding line.

In modern internal combustion engines, this valve is electrically driven and is commanded by an engine control unit (ECU) according to a dedicated managing strategy, thereby allowing an effective cooling of the pistons and consequently a significant fuel saving and polluting emission reduction. This electrically driven valve is commonly defined as squirters valve or Oil Piston Cooling Jets (OPCJ) valve.

In order to diagnose OPCJ valve failures, the auxiliary oil gallery, also referred as Oil Pistons Cooling Jets (OPCJ) gallery, is now usually provided with a dedicated pressure sensor, which monitors the pressure variation in the OPCJ gallery due to an electrical switching signal sent to the OPCJ valve. As a matter of fact, if the OPCJ valve is working properly, any switching signal should result in an effective switching of the OPCJ valve itself, namely an OPCJ valve opening or closure, which in turn should result in a significant pressure variation in the OPCJ gallery, so that a failure can be detected when the pressure variation does not occur.

However, the OPCJ gallery pressure sensor is an extra sensor that is installed in addition to a primary pressure sensor, which is generally located in the main oil gallery for other lubrication system managing purposes. Therefore, the OPCJ gallery pressure sensor results also an additional cost for the internal combustion engine. At least one object is to provide a new method to diagnose OPCJ valve failures. At least another object is to reach this goal with a simple, rational and rather inexpensive solution. In addition, objects, other desirable features and characteristics will become apparent from the subsequent summary and detailed description, and the appended claims, taken in conjunction with the accompanying drawings and this background.

SUMMARY

An embodiment of the invention provides a method to diagnose a failure of an OPCJ valve of an internal combustion engine, wherein the OPCJ valve is located in an auxiliary line connecting an engine lubrication line to at least an oil jet for squirting lubricating oil from the engine lubrication line towards a piston surface, and wherein the method provides for monitoring the pressure variation in the engine lubrication line due to a switching signal sent to the OPCJ valve. As a matter of fact, if the OPCJ valve is working properly, any switching signal should cause the OPCJ valve to effectively switch, namely to open or to close.

The real switching of the OPCJ valve causes a significant change of the hydraulic permeability of the engine lubrication system, thereby resulting in a significant pressure variation in the engine lubrication line. As a consequence, if said pressure variation does not occur, it means that the OPCJ valve has not really switched and that a failure has occurred. In view of the above, an effective diagnosis of the OPCJ valve is provided without the need of a dedicated pressure sensor in the OPCJ gallery.

According to an aspect of the invention, the pressure variation is compared with a determined target value of the pressure variation itself.

As a matter of fact, the pressure variation target value represents a threshold above which the OPCJ valve is considered to be properly working, and below which the OPCJ valve is considered to be not working. This embodiment has the advantage of providing an effective rule for evaluating whether an OPCJ valve failure has occurred or not.

According to another embodiment, the target value is determined on the base of one or more characteristic parameters of the lubricating oil into the engine lubrication line, such as for example its temperature and pressure. This embodiment has the advantage of providing a reliable target value to be compared with the pressure variation that is eventually occurred in response to a switching signal sent to the OPCJ valve. In fact, it has been found that the entity of the pressure variation caused by a real switching of the OPCJ valve can depend on the conditions of the lubricating oil into the engine lubrication line, which can be represented in terms of some characteristic parameters such as temperature and pressure.

These characteristic parameters can vary during the normal operation of the engine, so that a proper correction of the pressure variation target value is advisable in order to obtain a robust OPCJ valve diagnostic method. By way of example, the lubrication system of many modern internal combustion engines comprises a Variable Displacement Oil Pump (VDOP) driven by the engine, which replaces the conventional oil pump, in order to reduce the work necessary for drawing the lubricating oil from the sump and for delivering it under pressure through the engine lubrication line.

During normal engine operation, the VDOP can be commanded by the ECU to change its state from a high displacement configuration to a low displacement configuration or vice versa. Any change of the VDOP state causes a significant variation of the lubricating oil pressure into the engine lubrication line, so that a correspondent correction of the pressure variation target value is advisable.

According to another embodiment, the pressure variation target value is determined through an empirically determined map correlating the target value to said one or more characteristic parameters. This embodiment has the advantage that the map can be determined with a calibration activity and then stored in a data carrier of the ECU, thereby allowing the latter to diagnose the OPCJ valve.

According to still another embodiment, the switching signal can be provided by a standard piston cooling strategy, namely a standard strategy for operating the OPCJ valve in order to achieve an effective cooling of the pistons. In other words, the switching signal could be sent to the OPCJ valve by the ECU while executing the above mentioned standard piston cooling strategy, so that the diagnostic method could take advantage of said switching signal and monitor the pressure variation in the engine lubrication line, without effectively sending any dedicated switching signals to the OPCJ valve. This solution has the advantage of not affecting the normal operation of the OPCJ valve. However, the standard piston cooling strategy can provide for sending the switching signal at a time that is not suitable for performing the OPCJ valve diagnosis.

By way of example, if the switching signal is sent to the OPCJ valve while the VDOP state changes, it could be impossible to determine whether the pressure variation measured in the engine lubrication line is caused by a real switching of the OPCJ valve or by the change of the VDOP state. In order to solve this drawback, the diagnostic method can effectively comprise also the step of sending the switching signal to the OPCJ valve.

The diagnostic method according this solution results an intrusive test that can be advantageously executed at any time during the operation of the engine. As a contrast, this intrusive test changes the state of the OPCJ valve with respect to that provided by the standard piston cooling strategy, so that another switching signal should be sent to the OPCJ valve after the monitoring of the pressure variation, in order to restore the normal operation.

According to another embodiment, the switching signal is sent to the OPCJ valve when the pressure of the lubricating oil into the engine lubrication line is steady. This solution has the advantage of preventing that the intrusive test is performed under uncertain pressure conditions, due for example to a change of the VDOP state, as explained above.

According to still another embodiment, the pressure variation is monitored by means of a pressure sensor located in the engine lubrication line. As a matter of fact, the lubrication system of most modern internal combustion engines is already provided with a pressure sensor located in the engine lubrication line, and suitable for monitoring pressure variations. Therefore, this embodiment has the advantage that the diagnostic method can be simply implemented without any additional cost.

The method according to the invention can be carried out with the help of a computer program comprising a program-code for carrying out all the steps of the method described above, and in the form of a computer program product comprising the computer program. The computer program product can be embodied as an internal combustion engine comprising an engine lubrication line, a pressure sensor located in the engine lubrication line, an auxiliary line connecting the engine lubrication line to at least an oil jet for squirting lubricating oil from the engine lubrication line towards a piston surface, an OPCJ valve located in the auxiliary line, an ECU connected to the pressure sensor, a data carrier associated to the ECU, and the computer program stored in the data carrier, so that, when the ECU executes the computer program, all the steps of the method described above are carried out.

The method can be also embodied as an electromagnetic signal, said signal being modulated to carry a sequence of data bits which represent a computer program to carry out all steps of the method.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
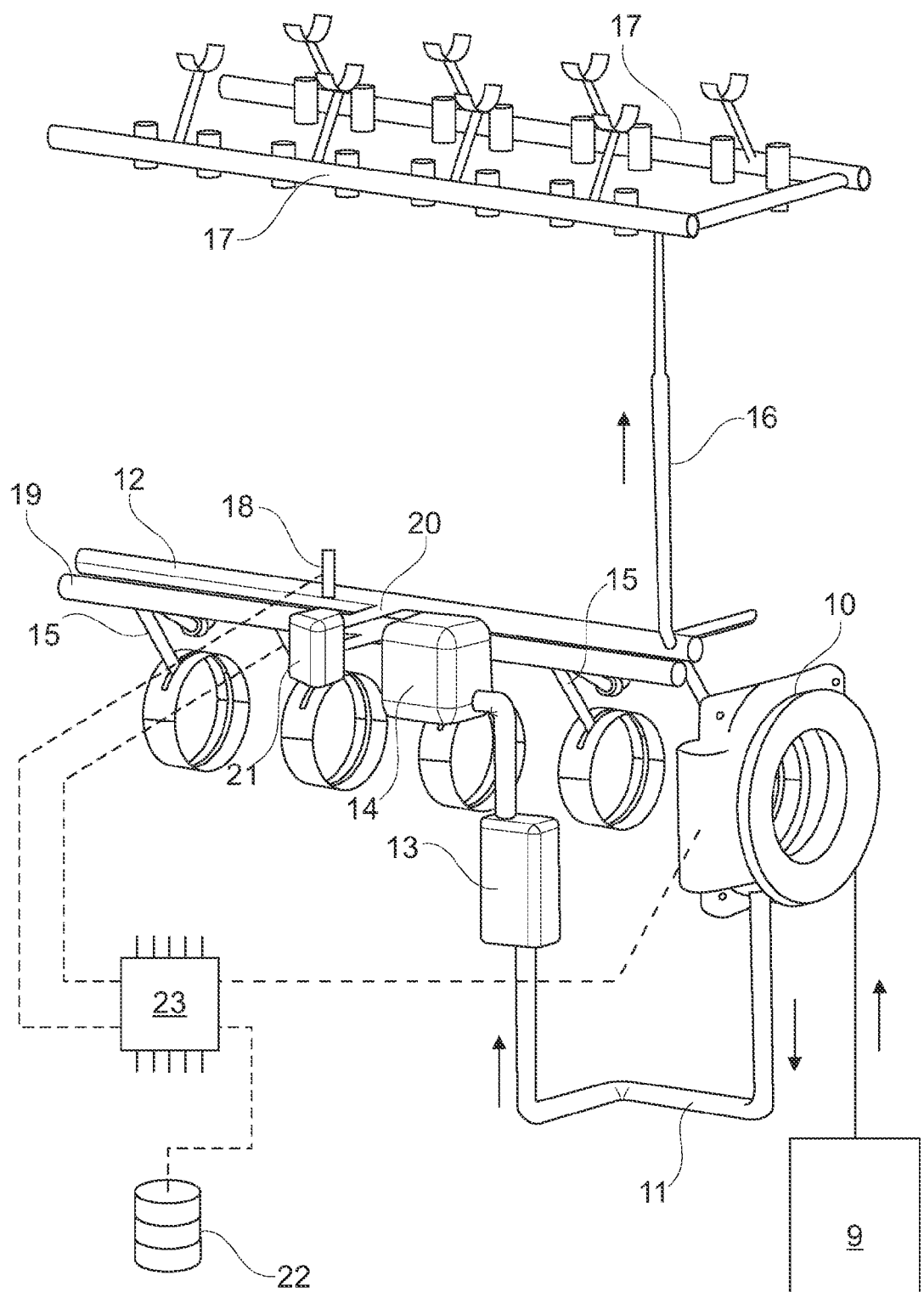
FIG. 1 is a schematic representation of a lubrication system of a multi-cylinder internal combustion engine.

The following detailed description is merely exemplary in nature and is not intended to limit application and uses. Furthermore, there is no intention to be bound by any theory presented in the preceding background or summary or the following detailed description.

Referring to the drawings, the engine lubrication system comprises a Variable Displacement Oil Pump (VDOP) 10 driven by the engine, which draws lubricating oil from a sump 9 and delivers it under pressure through a feeding line 11 to a main oil gallery 12 in the engine cylinder block. During the normal operation of the engine, the VDOP 10 can be commanded in order to selectively change its state from a high displacement configuration to a low displacement configuration or vice versa, thereby causing a significant variation of the pressure of the lubricating oil into the main oil gallery 12. The feeding line 11 is further provided with an oil cooler 13 and with an oil filter 14, for respectively cooling and filtering the lubricating oil flowing therein.

The main oil gallery 12 is connected via respective pipes 15 to a plurality of exit holes for lubricating crankshaft bearings (main bearings and big-end bearings). Through a head supply pipe 16 and a plurality of connecting pipes 17, the main oil gallery 12 is further connected to a plurality of exit holes for lubricating the camshaft bearings operating the valves, tappets, and the like. The pressure of the lubricating oil in the engine lubrication system is measured by means of a wide range pressure sensor 18 located in the main oil gallery 12.

In order to cool the engine pistons, the engine lubrication system comprises an auxiliary oil gallery 19 in the engine cylinder block, which is connected via respective pipes to a plurality of oil jets (not shown) for squirting lubricating oil into an upper crankcase area towards piston surfaces. The auxiliary oil gallery 19 is connected to the main oil gallery 12 via a feeding line 20.

An electrically driven Oil Piston Cooling Jets (OPCJ) valve 21 is located in the feeding line 20, in order to selectively open and close the passageway from the main oil gallery 12 and the auxiliary oil gallery 19. Any switching of the OPCJ valve 21, namely any OPCJ valve opening or closure, is commanded by an electrical switching signal sent to the OPCJ valve 21.

During the normal operation of the engine, the OPCJ valve 21 is commanded according to a standard piston cooling strategy, which provides for generating electric switching signals, in order to control the lubricant oil flow so as to achieve an effective cooling of the pistons. In this contest, an embodiment provides a method for diagnosing whether the OPCJ valve 21 is working properly or not.

The method generally provides for monitoring, by means of the pressure sensor 18, the pressure variation in the main oil gallery 12 due to a switching signal sent to the OPCJ valve 21. If the OPCJ valve 21 is working properly, the switching signal causes the OPCJ valve 21 to effectively switch, namely to open or to close, so that the hydraulic permeability of the engine lubrication system changes, thereby resulting in a significant pressure variation in the main oil gallery 12. If this significant pressure variation does not occur, it means that the OPCJ valve 21 did not effectively switch and that a failure has occurred.

According to this principle (see FIG.2), the method firstly provides for determining a target value TV (block 210) above which the OPCJ valve 21 is considered to be properly working, and below which the OPCJ valve 21 is considered to be not working.

This target value TV is determined on the base of a plurality of characteristic parameter of the lubricating oil into the main oil gallery 12, including temperature and pressure. As a matter of fact, it has been found that these characteristic parameters can affect the pressure variation due to a real switching of the OPCJ valve 21, so that a reliable correction of the target value TV is advisable in order to obtain a robust OPCJ valve diagnostic method. In particular, the target value TV should be different depending on the pressure level in the main oil gallery 12 caused by the present VDOP state. The target value TV can be determined through an empirically determined map correlating the target value to the above mentioned characteristic parameters.

Subsequently, the diagnostic method provides for measuring the pressure P1 in the main oil gallery 12 (block 211) before the switching signal is sent to the OPCJ valve 21 (block 212), for measuring the pressure P2 in the main oil gallery 12 (block 213) after the switching signal has been sent to the OPCJ valve 21, and for calculating the difference Δ between the measures P2 and P1 (block 214). Both the pressure measures P1 and P2 are performed by means of the pressure sensor 18.

The difference Δ is then compared with the previously determined target value TV (block 215). If the difference Δ is equal or greater than the target value TV, the method provides for generating a succeed signal representing that the OPCJ valve 21 is working properly (block 216). Conversely, if the difference A is lower than the target value TV, the method provides for generating a failure signal representing that the OPCJ valve 21 is not working (block 217).

Figure 2:
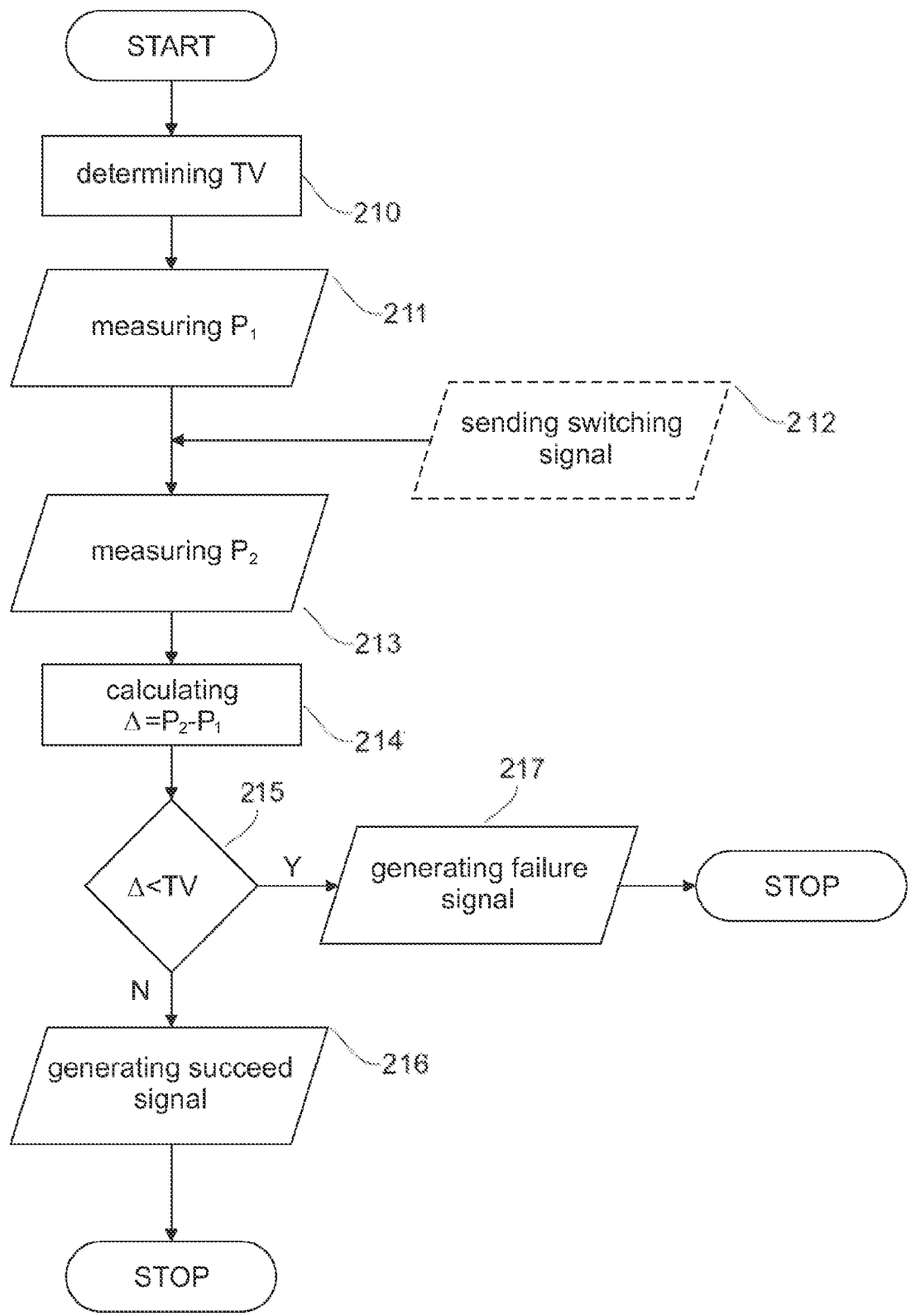
FIG. 2 is a flowchart representing a diagnostic method according to an embodiment.

According to the flowchart of FIG. 2, the diagnostic method does not provide for effectively sending the switching signal to the OPCJ valve 21, since the switching signal is provided by the above mentioned standard piston cooling strategy. In other words, the switching signal is sent to the OPCJ valve 21 while executing the standard piston cooling strategy, so that the diagnostic method take advantage of said switching signal and monitor the pressure variation in the main oil gallery 12, without effectively sending any dedicated switching signals to the OPCJ valve 21. However, it may happen that the standard piston cooling strategy provides for sending the switching signal at a time that is not suitable for performing the OPCJ valve diagnosis.

By way of example, if the switching signal is sent to the OPCJ valve 21 while the VDOP state changes, it could be impossible to determine whether the pressure variation measured in the main oil gallery 12 is caused by a real switching of the OPCJ valve 21 or by the change of the VDOP state. In order to solve this drawback, the diagnostic method can be embodied in the form of an intrusive test that can be executed at any time during the operation of the engine.

Figure 3:
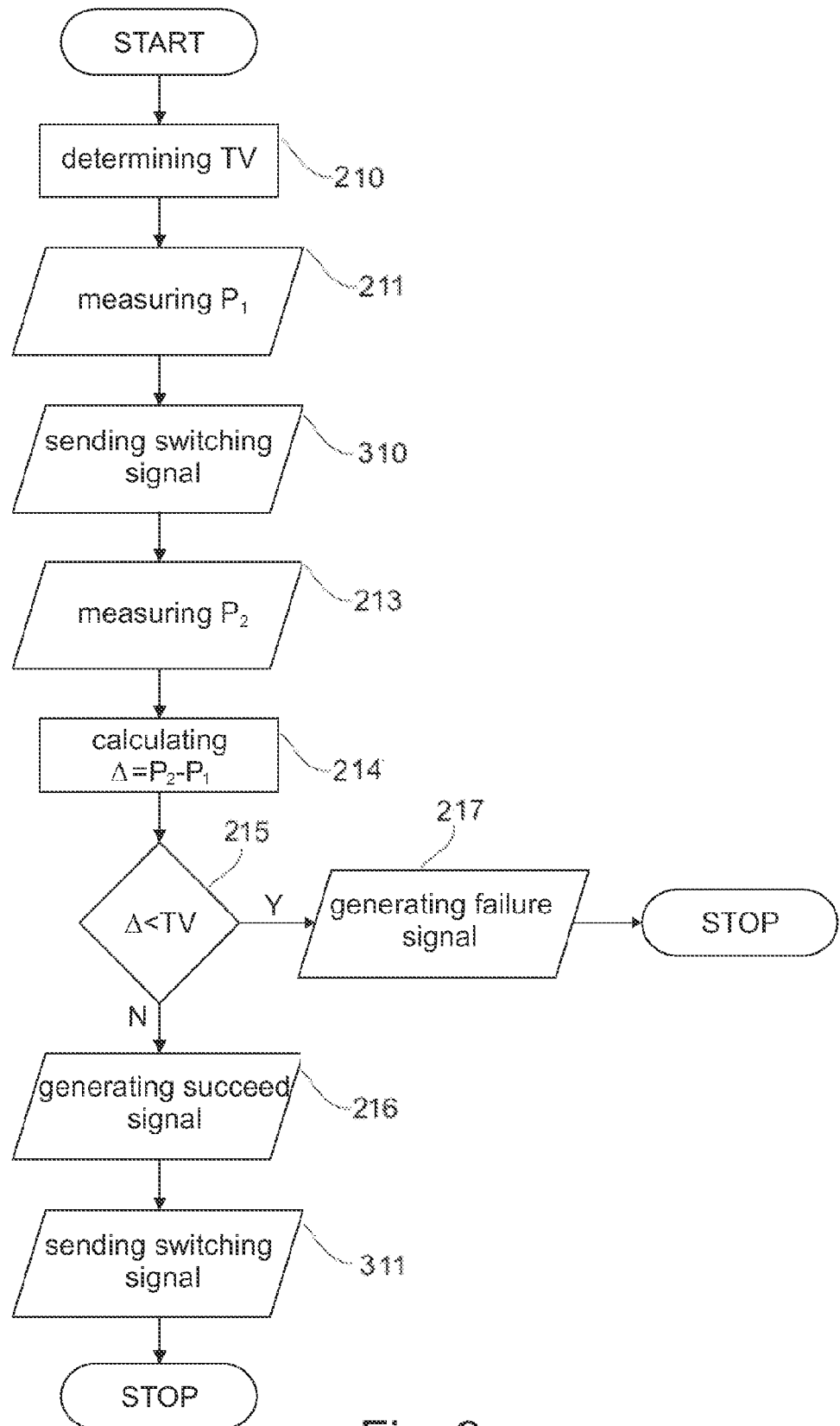
FIG. 3 is a flowchart representing a diagnostic method according to another embodiment.

As shown in the flowchart of FIG. 3, the intrusive test differs from the preceding diagnostic method in that it comprises also the step of effectively sending the switching signal to the OPCJ valve 21 (block 310), between the steps of measuring the pressures P1 (block 211) and P2 (block 213) in the main oil gallery 12. In particular, the switching signal can be sent to the OPCJ valve 21 when the pressure of the lubricating oil into the main oil gallery 12 is steady, thereby preventing that the test is performed under uncertain pressure conditions, due for example to a change of the VDOP state as explained above.

Naturally, this intrusive test changes the state of the OPCJ valve 21 with respect to that provided by the standard piston cooling strategy. As a consequence, if the comparison returns that the pressure difference Δ is equal or greater than the target value TV, the intrusive test comprises also the additional step of sending another switching signal to the OPCJ valve 21 (block 311), in order to restore its normal operation.

The diagnostic method according to both the preceding embodiments can be managed with the help of a computer program comprising a program-code for carrying out all the steps described above. The computer program is stored in a data carrier 22 associated to an engine control unit (ECU) 23, which is connected in turn to the pressure sensor 18.

The ECU 23 is also connected to the VDOP 10, in order to selectively change its state, and to the OPCJ valve 21, in order to send the switching signals. In this way, when the ECU 23 executes the computer program, all the steps of the embodiments of the method described above are carried out.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method to diagnose a failure of an OPCJ valve of an internal combustion engine, the OPCJ valve located in an auxiliary line connecting an engine lubrication line to an oil jet for squirting lubricating oil from the engine lubrication line towards a piston surface, and the method comprises:
   receiving a switching signal sent to the OPCJ valve; and
   monitoring a pressure variation in the engine lubrication line due to the switching signal sent to the OPCJ valve, wherein monitoring the pressure variation includes monitoring the pressure variation at a portion of the engine lubrication line that is in constant fluid communication with a pump.

2. The method according to claim 1, further comprising comparing with a target value of the pressure variation.

3. The method according to claim 2, further comprising determining the target value based on an operating parameter of the lubricating oil into the engine lubrication line.

4. The method according to claim 3, wherein said operating parameter is selected from a temperature and a pressure of the lubricating oil into the engine lubrication line.

5. The method according to claim 3, wherein a pressure is determined through an empirically determined map correlating the target value to said operating parameter.

6. The method according to claim 1, further comprising sending the switching signal to the OPCJ valve.

7. The method according to claim 6, wherein the switching signal is sent to the OPCJ valve when a pressure of the lubricating oil into the engine lubrication line is steady.

8. The method according to claim 1, wherein the pressure variation ($\Delta$) is monitored with a pressure sensor located in the engine lubrication line.

9. A non-transitory computer readable medium embodying a computer program product, said computer program product comprising:
- a diagnostic program, for diagnosing a failure of an OPCJ valve of an internal combustion engine, the OPCJ valve located in an auxiliary line connecting an engine lubrication line to an oil jet for squirting lubricating oil from the engine lubrication line towards a piston surface, the diagnostic program configured to:
- receive a switching signal sent to the OPCJ valve; and
- monitor a pressure variation in the engine lubrication line due to the switching signal sent to the OPCJ valve, wherein the diagnostic program is configured to monitor the pressure variation at a portion of the engine lubrication line that is in constant fluid communication with a pump.

10. The non-transitory computer readable medium embodying the computer program product according to claim 9, the diagnostic program further configured to compare with a target value of the pressure variation.

11. The non-transitory computer readable medium embodying the computer program product according to claim 10, the diagnostic program further configured to determine the target value based on an operating parameter of the lubricating oil into the engine lubrication line.

12. The non-transitory computer readable medium embodying the computer program product according to claim 11, wherein said operating parameter is selected from a temperature and a pressure of the lubricating oil into the engine lubrication line.

13. The non-transitory computer readable medium embodying the computer program product according to claim 12, wherein the pressure is determined through an empirically determined map correlating the target value to said operating parameter.

14. The non-transitory computer readable medium embodying the computer program product according to claim 9, the diagnostic program further configured to send the switching signal to the OPCJ valve.

15. The non-transitory computer readable medium embodying the computer program product according to claim 14, wherein the switching signal is sent to the OPCJ valve when a pressure of the lubricating oil into the engine lubrication line is steady.

16. The non-transitory computer readable medium embodying the computer program product according to claim 9, wherein the pressure variation ($\Delta$) is monitored with a pressure sensor located in the engine lubrication line.

17. An internal combustion engine, comprising:
- an engine lubrication line;
- a pressure sensor located in the engine lubrication line in constant fluid communication with a pump;
- an auxiliary line connecting the engine lubrication line to an oil jet for squirting lubricating oil from the engine lubrication line towards a piston surface;
- an OPCJ valve located in the auxiliary line;
- an ECU connected to the pressure sensor, the ECU configured to:
  - receive a switching signal sent to the OPCJ valve; and
  - monitor a pressure variation in the engine lubrication line due to the switching signal sent to the OPCJ valve.

18. The internal combustion engine according to claim 17, the ECU further configured to compare with a target value of the pressure variation.

19. The internal combustion engine of claim 17, wherein the ECU is further configured to determine whether the OPCJ valve has failed based on the switching signal and the pressure variation.

* * * * *